US006825975B2

United States Patent
Gallas

(10) Patent No.: US 6,825,975 B2
(45) Date of Patent: Nov. 30, 2004

(54) LIGHT FILTERS USING THE OXIDATIVE POLYMERIZATION PRODUCT OF 3-HYDROXYKYNURENINE (3-OHKYN)

(75) Inventor: James Gallas, San Antonio, TX (US)

(73) Assignee: Photoprotective Technologies, Inc., San Antonio, TX (US)

(*) Notice: Subject to any disclaimer, the term of this patent is extended or adjusted under 35 U.S.C. 154(b) by 0 days.

(21) Appl. No.: 10/228,977

(22) Filed: Aug. 27, 2002

(65) Prior Publication Data

US 2004/0042072 A1 Mar. 4, 2004

(51) Int. Cl.[7] ................................................. G02B 5/20
(52) U.S. Cl. ......................... 359/350; 359/355; 359/361
(58) Field of Search ................................. 359/350, 355, 359/356, 361

(56) References Cited

U.S. PATENT DOCUMENTS 5,187,207 A * 2/1993 Gallas ......................... 523/106

OTHER PUBLICATIONS

Aquilina, JA; Carver, JA; Truscott, RJ "Oxidation products of 3–hydroxykynurnine bind to lens proteins: relevance for nuclear cataract" May 1997 National Library of Medicine.*

* cited by examiner

Primary Examiner—Drew A. Dunn
Assistant Examiner—Joshua L Pritchett
(74) Attorney, Agent, or Firm—A. Triantaphyllis

(57) ABSTRACT

The present invention is directed to a transparent medium incorporating the oxidative polymerization of 3-hydroxykynurenine, a synthetic version of the yellow-to-brown pigment that occurs in the ocular crystalline lens with age. Because this coloration in the ocular lens is believed to offer photoprotection to the retina, it may represent an ideal sun lens filter with an optical transmission spectrum that is compatible with the psychophysical and neuro-physiological characteristics of the vision system.

20 Claims, 4 Drawing Sheets

Transmission Spectrum of Derivatized 3OH-Kynurenine in Acrylic Lens.

Figure 1. Transmission of the Ocular Lens – age 49 years from Weale
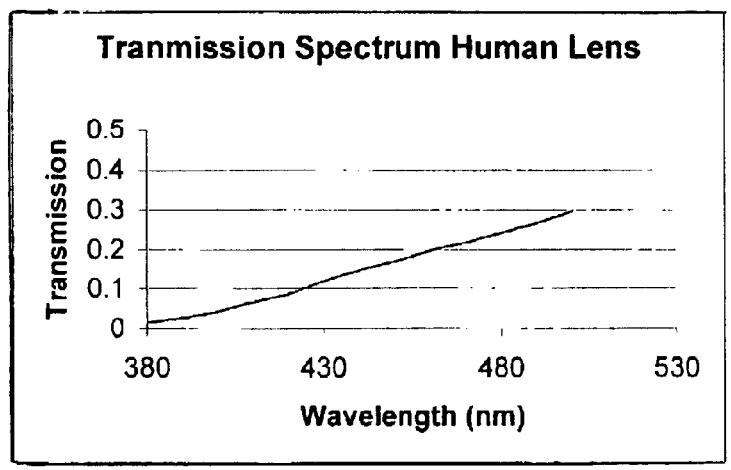
Figure 2. Transmission Spectrum of 3OH-Kynurenine in Water
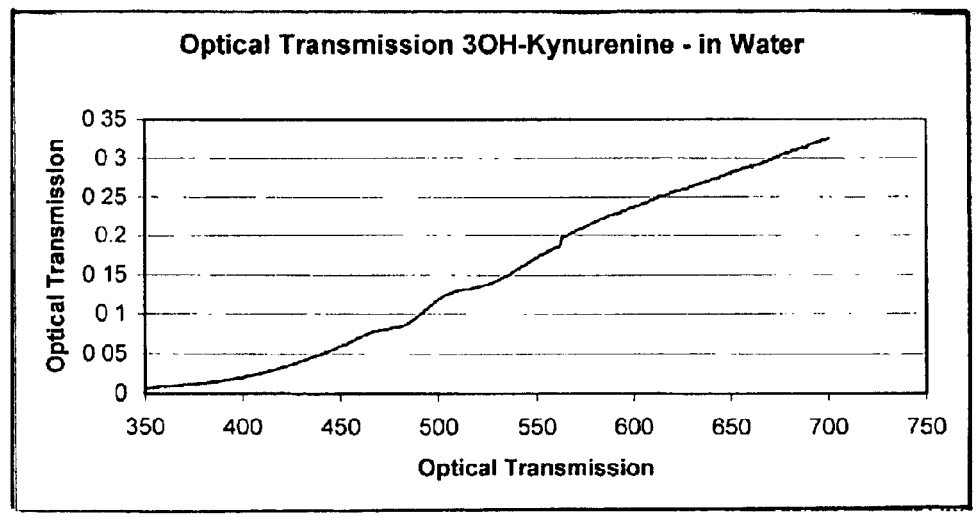

Figure 3. Transmission Spectrum of Derivatized 3OH-Kynurenine in Tetrahydrifuran
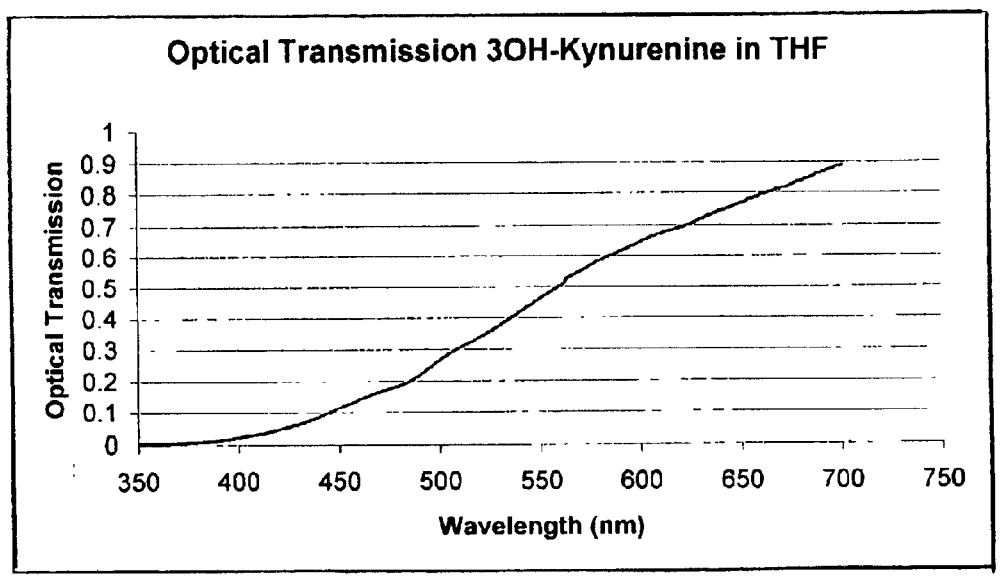
Figure 4. Transmission Spectrum of Derivatized 3OH-Kynurenine in CR39 Lens
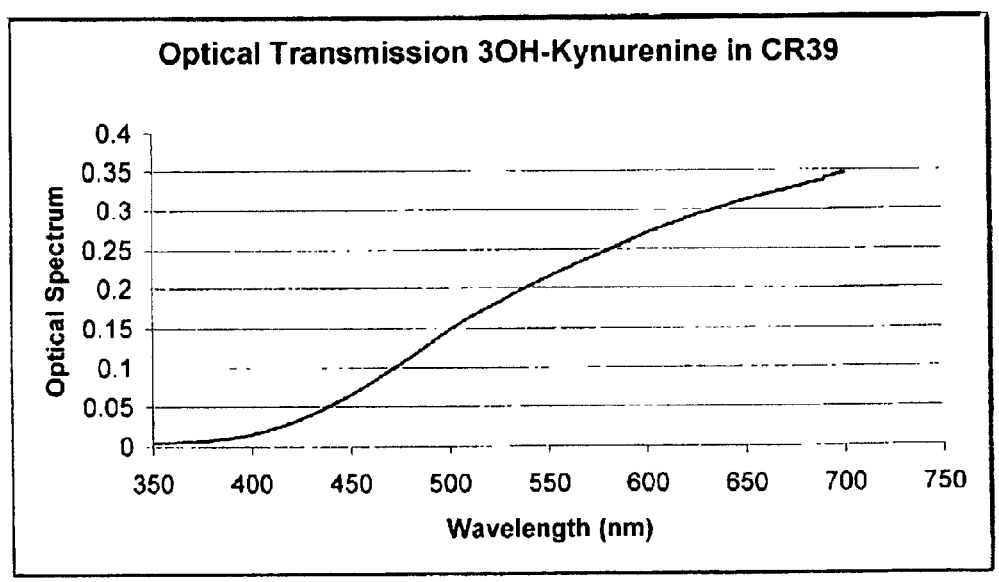

Figure 5. Transmission Spectrum of Derivatized 3OH-Kynurenine in Acrylic Lens.
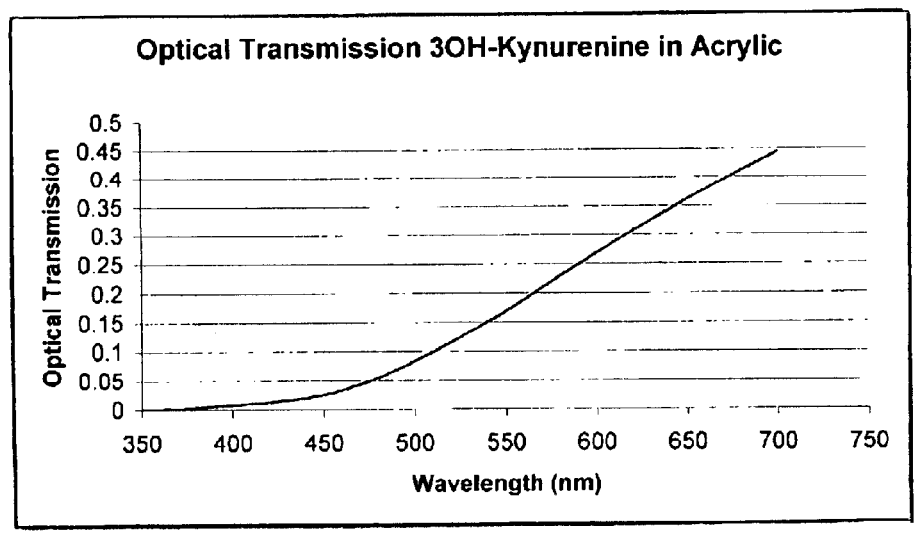
Figure 6. Transmission Spectrum of Underivatized, aqueous 3OH-Kynurenine in Polyvinyl alcohol (PVA) film.
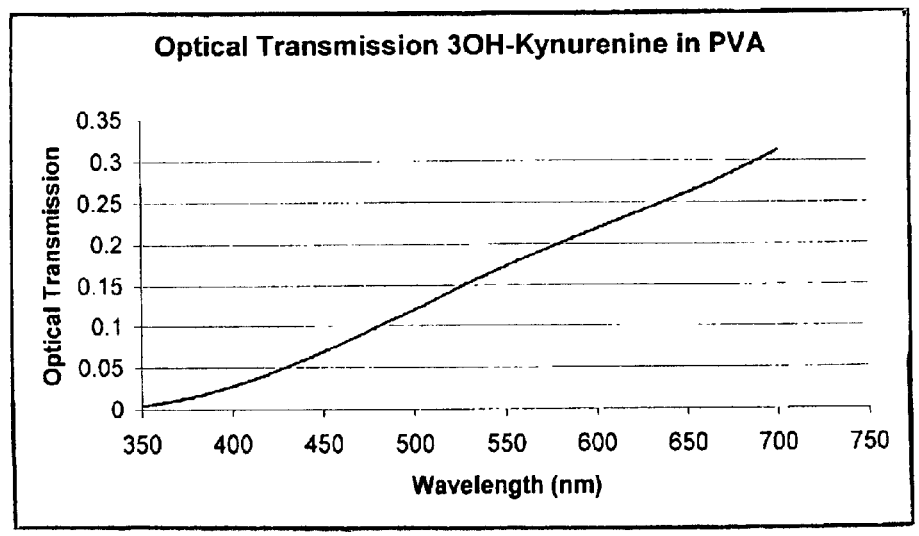

Figure 7. Transparent solid substrate, containing synthetic lens pigment of the crystalline lens derived from 3-hydroxy-kynurenine dispersed uniformly within substrate.

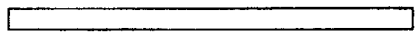

Figure 8. Transparent coating (1) containing uniformly dispersed synthetic lens pigment of the crystalline lens derived from 3-hydroxy-kynurenine and said coating covering a second transparent solid substrate (2).

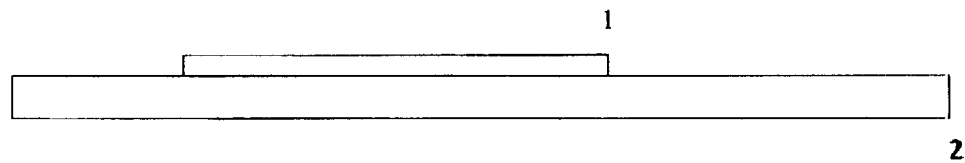

LIGHT FILTERS USING THE OXIDATIVE POLYMERIZATION PRODUCT OF 3-HYDROXYKYNURENINE (3-OHKYN)

CROSS-REFERENCE TO RELATED APPLICATIONS

The current application makes reference to the previous patent, also by the current applicant, U.S. patent application Ser. No. 614,062, "Medium Incorporating Melanin as an Absorbing Pigment for Protection Against Electromagnetic Radiation", J. M. Gallas (Filed Nov. 9, 1990)

STATEMENT REGARDING FEDERALLY SPONSORED RESEARCH OR DEVELOPMENT

Not Applicable

Reference to Sequence Listing, a Table, or a Computer Program Listing Compact Disk Appendix Not Applicable

BACKGROUND OF THE INVENTION

This invention relates to the field of eye protection and vision enhancement by filters of UV and the higher energy visible (HEV) light—such as sunglass lenses. More specifically, it relates to the use of the polymerization product resulting from the oxidation of 3-Hydroxykynurenine (3-OHKyn), as a light filtering component or dye to achieve such eye protection and vision enhancement in a variety of products including sunglass lenses, and ophthalmic lenses in general, windows, light filters such as photograph covers, packaging material, canopies, etc., and other similar media utilized to protect valuable goods from radiation damage.

Reference has been made previously to optical filters that mimic the yellow pigment of the human ocular lens by a) Parties associated with the product "AcrySofNatural IOLs" and found on the internet web site: http://www.eyeworld.org/aug02/0802p30.html, and by b) Gallas on the concept of the current patent application and made in the form of a Disclosure document deposit to the PTO.

BRIEF SUMMARY OF THE INVENTION

Over the last decade, scientific research has underscored the threat posed by both UV light to the ocular lens, and HEV (high energy visible) light to the retina. And recently, an increasing appreciation for the importance of HEV light reduction has occurred within the ophthalmic industry. Lenses that reduce or eliminate HEV (mainly the blue and violet) light generally cause the wearer to experience increased contrast and visual acuity. Such lenses also offer more protection to the retina against diseases that have a photooxidative basis. However, such lenses often cause distortions in color and loss of proper color perception.

It is known that the human crystalline lens yellows with age and even turns brown, along with the occurrence of cataracts. Because the presence of cataracts impedes the vision process due to excessive light scatter and glare from fluorescence, the aged, cataract lens is removed and replaced with a clear lens. However, the yellow-brown coloration reduces primarily the HEV (high energy visible) light; thus, it should also provide the same vision-enhancing benefits as the dyes used in other HEV-reducing sun lenses. This protective feature of the crystalline lens is illustrated in FIG. 1. (taken from Weale R A: Age and the transmittance of the human crystalline lens. *J Physiol* 395:577–587, 1988.)

But because both the cataract and the yellow-brown pigment occur with age, the vision-protecting and vision-enhancing benefits of the yellow-brown pigment are masked by the vision-impeding aspects of the cataract. This is unfortunate because there are significant vision benefits that can be associated with the yellow-brown ocular pigment of the crystalline lens.

First, it should be expected that the neuro-physiology of the eye must be completely compatible with the optical properties of this pigment—and specifically its transmission spectrum, and that minimal loss of color perception should thus occur from any filter that utilizes it. This yellow-brown filter should also be expected to offer protection to the retina by reducing the intensity of the HEV light and thus reducing the risks of age-related macular degeneration (AMD).

In practice, this protective coloration occurs after the retina has already been exposed to damaging sunlight for many years of a person's childhood and early adult life. And, in the case of senior citizens who undergo operations to remove the cataract lens, a clear plastic lens is used as the replacement. This occurs, unfortunately, at a time of their lives when the antioxidant capacity of their retina is seriously compromised; and the increased dose of HEV light, that is now able to reach the retina, therefore increases the risk of retinal damage (AMS).

However, it is possible to synthesize the yellow pigment of the human crystalline lens in vitro, and which has a transmission spectrum identical to that of the material synthesized in vivo. Such an in vitro-synthesized lens pigment (hereinafter referred to as SLP), used in an optical filter, such as a sun lens, would therefore provide the same protection to the eye from sunlight damage, and the same contrast enhancement and color perception-preserving qualities as the natural, yellow-to-brown pigment produced in vivo by the ocular lens.

The molecule that is responsible for the yellow-to-brown coloration of the crystalline lens has been identified as the oxidative polymerization product of 3-Hydroxykynurenine (3-OHKyn). Thus, it has been shown that a synthetic version of the yellow pigment of the human ocular lens, SLP, can be made in vitro by the auto-oxidation by the same precursor, 3-OHKyn, in aqueous media.

The auto-oxidation of (3-OHKyn) in water has bee described elsewhere (Garner, B., D C Shaw, R A Lindner, J A Carver, and R J Truscott, Non-oxidative modification of lens crystallins by kynurenine: novel post-translational protein modification with possible relevance to ageing and cataract. Biochimica et Biophsica Acta. 1476(2):265–78, 2000), and is summarized as follows:

Auto-oxidation, or polymerization of 3-Hydroxykynurenine (3-OHKyn) proceeds by dissolving 3-OHKyn in water and then bubbling air into the stirred solution, after raising the pH to a value of about 8. The darkness and degree of brownness can be controlled by the concentration of precursor monomer and polymerization conditions that favor the degree of oxidation—like higher values of the pH, temperature and incubation time.

As a specific example, a) 2.5 grams of 3-Hydroxykynurenine were dissolved in 1L of de-ionized water, b) 0.07 g of ferric chloride, $FeCl_3$, was dissolved in 250 cc of de-ionized water; and c) 6.1 g of potassium persulphate were dissolved in 250 cc of de-ionized water; then a), b) and c) were each heated to 50 degrees C.; then solution b) was added to a) to produce solution d) and stirred; then solution c) was added to d) drop-wise over a period of 5 minutes and the final solution was allowed to stir, under a condenser, at 50 degrees C. for 24 hours. The product, SLP, was a concentrated black solution e). The synthesis product was then purified as follows: 200 cc of a dilute solution of aqueous sulphuric acid was added to e) bringing the pH of the solution e) to a value of 1.5. and a final volume of 1700 cc. The solution was allowed to incubate without stirring for 24 hours. This caused the black polymerization product to aggregate and settle to the bottom of the vessel. Then 1.3 L of the clear, lightly colored supernatant was poured off. This supernatant contains water-soluble, small oligomers of the product as well as un-reacted monomer and the synthesis reagents and salts. An additional 1.3 of fresh de-ionized and acidified water was added and stirred with the remaining 0.4 L of solution to give, again, a 1.7 L solution at pH 1.5. This solution was allowed to incubate unstirred for an additional 24 hours and 1.3 L of the lightly-colored supernatant was poured off.

The aqueous product was able to be re-suspended and solubilized by readjusting the pH to 8 with the addition of 100 cc of a dilute solution of aqueous sodium hydroxide; and it was able to be dispersed well in its acidified form by mixing with tetraydrofuran as is described later in this paper. A small aliquot of this solution was found to have 3 mg of the synthetic ocular lens pigment (SLP) per mL of water. This aqueous solution is referred hereinafter as the "stock solution."

A less concentrated solution for optical measurements was prepared by adding 1 ml of the stock solution to 2 ml of water to give a concentration of 1 mg/ml. The diluted solution of the yellow pigment was then injected into a cuvette with 1 cm path length and placed into the sample compartment of a recording UV-Visible spectrophotometer. The transmission spectra is shown in FIG. 2.

The invention proposed here is to incorporate, into plastic and glass optical lenses, and other light filters, a synthetic version of the same material found in the human crystalline lens, the polymerization product of 3-OHKyn, and responsible for the optical transmission spectrum of the crystalline lens. This material is hereafter referred to as the "synthetic lens pigment," or "SLP," and its precursor referred to as 3-OHKyn. Because this material always occurs in an aqueous environment—and indeed, its surface structure is presumed to be hydrophilic—it will be necessary to convert the surface of the molecular structure to one that is hydrophobic in order for the final synthetic material to disperse well into most of the liquid plastic resins and monomers that are typically used in ophthalmic devices. This enhanced dispersibility reduces objectionable light scatter and haze in the final ophthalmic lens or light filter product. After purification, the material can be combined with liquid plastic resin in a thermoset casting process or in a thermoplastic, injection molding process where the yellow-to-brown pigment powder or liquid is evenly dispersed in the plastic to form sunglass lenses and other plastic light filters. At least one example of a hydrophilic plastic application will be provided.

Advantages of the Invention: Such a sunglass lens should offer very good protection to the retina and ocular lens while not disturbing color perception. While reduction of high energy visible (HEV) light offers increased protection to the retina, there is a chance that a reduction of the violet and blue colors may disturb the perception of color when people use such sunglass lenses. This loss of color perception is less likely to occur with lenses made with SLP because the optical transmission of such lenses closely match the transmission of the actual human lens—for which the neurophysiology of the eye-brain system is well-adapted. Use of the polymerization precursor, 30 HKyn, that is actually used in the in vivo polymerization synthesis should give the best representation of the optical transmission spectrum of the naturally-occurring ocular pigment.

While it is possible to mimic the transmission spectrum of SLP with artificial dyes, there are several disadvantages to doing this:

1. Small differences between the transmission spectrum of SLP and the simulated one achieved by combining artificial dyes lead to significant differences in the color perception when using such lenses on tests like the Farnsworth-Munsell color test. If the act of mimicking the transmission spectrum is left to the optician or optometrist, it is very likely that these differences will not be appreciated;
2. Because several artificial dyes will be needed in order to better mimic the SLP transmission spectrum, they will fade at different rates when exposed to sunlight after time. This will cause the transmission spectra to differ even more.

BRIEF DESCRIPTION OF THE SEVERAL VIEWS OF THE DRAWING

For a detailed description of the present invention, reference will now be made to the accompanying drawings wherein:

FIG. 1 is a graph that shows the transmission of an actual ocular lens versus the wavelength.

FIG. 2 is a graph that shows the transmission of SLP in water, made according to a standard procedure.

FIG. 3 is a graph that shows the transmission of SLP in Tetrahydrofuran.

FIG. 4 is a graph that shows the transmission of SLP in a cast CR39 lens.

FIG. 5 is a graph that shows the transmission of SLP in an acrylic lens.

FIG. 6 is a graph that shows the transmission of SLP in a PVA film.

FIG. 7 is a diagram showing a transparent solid substrate, containing synthetic lens pigment of the crystalline lens derived from SLP.

FIG. 8 is a diagram showing a transparent coating containing SLP, and covering a transparent solid substrate.

DETAILED DESCRIPTION OF THE INVENTION

Summary of Definitions

A "solid transparent substrate", as used in this patent application, is a solid object made of a clear glass or a polymer, and generally taking the form of a light filter. Examples of such are, but not limited to: flat or curved sheets of plastic or glass such as sunglass lenses, ophthalmic lenses, windows, contact lenses, and computer screens. A diagram of a transparent solid substrate is shown in FIG. 7.

The term "thermoset" process is one in which the plastic by the action of an oxidizer or initiator acting upon a monomeric liquid, causing the monomer to polymerize.

The term "thermoplastic" process refers to the process in which the plastic is already formed and is caused to flow or become liquified by the action of heat and pressure.

"SLP" means synthetic lens pigment.

"Uniformly dispersed" means that the synthetic lens pigment shall be mixed sufficiently well within the solid transparent substrate that there is negligible light scatter or haze when objects are viewed through the solid transparent substrate that contains the SLP.

In the past, synthetic SLP has been prepared by using autoxidative polymerization in aqueous media. Most lenses and light filters are made with transparent, optical plastic. It is apparent that the aforementioned advantages of utilizing SLP in lenses are not limited to ophthalmic lens systems only and that SLP may be utilized in any media that are suitable for preparing apparatus devices that provide protection to humans and valuable goods from radiation. Accordingly, SLP may be utilized in connection with any lens systems or similar devices such as ophthalmic devices including plastic or glass sunglasses, protective eyewear such as welders or skiers masks or goggles, and hard (hydrophobic) or soft (hydrophilic) contact or intraocular lenses; glass or plastic windows such as automobile, building or airplane windows; glass or plastic packaging material such as beverage and food containers; thin plastic sheets; umbrellas; canopies; and other similar devices or substances suitable for the protection of humans or radiation-sensitive substances from radiation. With respect to ophthalmic lenses it should be understood that those lenses may be prepared with or without optical prescriptions to correct visual defects.

Preferred Embodiment

Light absorbing dyes are incorporated in to plastics by the process of compounding in what is broadly called a thermoplastic process. In this case the thermoplastic is heated and flows in a manner that makes it serve as a solvent for the dye, and the dye is mixed or dispersed uniformly in the liquefied plastic. If the thermoplastic is optically clear, then the dye may allow the plastic to transform into a clear, but colored filter, with a transmission spectrum essentially the same as the dye would have in some suitable solvent. In another method, the dye is first dissolved in the liquid plastic monomer and the plastic is subsequently cured or hardened in what is called a thermoset process. In a third process, dyes are incorporated into plastic, already in the form of solid lenses or sheets, by dipping the plastic article into an aqueous, or water/co-solvent bath containing the dye at elevated temperatures—so that the dye can diffuse into the plastic surface. In another process, a dye can be incorporated into a plastic as a surface coating. In one example of this process, a dye is dissolved in a plastic resin commonly called a "hard-coat" or "scratch-resistant" resin and the plastic article or lens is dipped into such resin. Such an example is shown graphically in FIG. 8. The thin coating thus formed, and which contains the dye, is made to cure or harden by the action of heat or light in combination with a pre-dissolved heat- or light-activated initiator.

In the preferred embodiment of the present invention, the oxidative polymerization product of 3-hydroxykynurenine is derivatized and dissolved in a leading optical resin CR39, in a thermoset process. In this process of derivatization, the pigment is both sequestered and given increased solubility in the resin.

Because the 3-hydroxykynurenine monomer polymerizes to form a polyphenol, the techniques used to derivatize it will be those appropriate for polymers containing hydroxyl groups.

Derivatizing agents may include bisfunctional agents such as methylchloroformate, methylallylchloroformate, vinylchloroformate, or allylchloroformates; methacryl oxypropyl dimethyl chloro silane; methacryl chloride; isocyanatoethyl methacrylate and other derivatizing agents which contain a group able to undergo free radical polymerization as well as a chemical reactive group that can be reacted with carboxyl or phenolic functional groups on the polyphenol.

EXAMPLE 1

In order to achieve pigment dispersability and solubility in CR39 plastic monomer, the synthetic lens pigment, SLP, was derivatized with methylchloroformate as follows:

A solution of SLP in tetrahydrofuran (THF) was made by adding adding drop-wise a concentrated solution of hydrochloric acid to 100 cc of a "stock solution" of SLP in water, defined on page 4, until the pH dropped to 1.5, causing the SLP to aggregate; the supernatant was poured off and the aggregated SLP was filtered and air dried, and then re-suspended in THF.

6 cc of pyridine was added to 30 cc of tetrahydrofuran (THF) containing 4 g of SLP. Then 9 cc of methylchloroformate was added drop-wise over a period of 10 minutes and stirred for 5 hours. The product was filtered and the washed 3 times with equal volumes of de-ionized water. The product was then injected into hexane and dried to a powder using an oven at 50 degrees Celsius for 15 hours.

0.3 g of the powder was dissolved into 100 cc of liquid CR39 monomer and the solution was heated to 50 degrees C. Then 3 g of benzoyl peroxide was added and the solution was stirred until all of the benzoyl peroxide was dissolved. The temperature was increased to 60 and some of the solution was injected into a mold formed by two sheets of glass separated by a rubber "o"-ring. The glass mold was held together by a spring clamp and the unit was placed into an oven at 65 degrees C. for 20 hours. The result was a clear, amber-colored plastic disc lens.

The transmission spectrum of this disc is shown in FIG. 4. The spectra are similar to the transmission spectra of the Ocular pigment alone (FIG. 1) in the 380 nm to 500 nm range; however, bleaching, due to the exposure of the pigment to the benzoyl peroxide during curing has caused the red end of the transmission spectrum to increase. This feature is not a significant objection because the protection afforded by the SLP in CR39, in the region of wavelengths 350 nm to 500 nm, has not been appreciably affected by the curing process as the optical transmissions in both FIGS. 1 and 4 are similar.

In the second preferred embodiment, the synthetic ocular lens pigment (SLP) is mixed with a thermoplastic that is heated until it flows and functions as a solvent for the SLP powder.

EXAMPLE 2

0.2 g of SLP powder, derivatized and made into a powder as in Example 1, was mixed with 120 g of acrylic pellets and compounded being heated under pressure, causing the SLP to be uniformly blended with the acrylic plastic. The products was injected into flat test plates yielding a clear, yellow-brown "lens" with a transmission spectrum as shown in FIG. 5.

Another method for incorporating the SLP product into optical lenses is by dispersing it in polyvinyl alcohol (PVA). PVA films may be bound to thin, rigid sheets of other plastics to provide mechanical integrity to the flexible PVA film. These laminates may then be inserted into lens molds to produce plano and Rx lenses in either a thermoplastic process or in a thermoset process. While this method is less commonly used in the production of optical lenses, it has the advantage of using aqueous based SLP

EXAMPLE 3

To an aqueous solution of 0.4 g SLP in 100 cc of de-ionized water was added 2.0 g of PVA powder and heated to 95 degrees C. while stirred After all of the PVA powder dissolved in the SLP/water system, the solution was allowed to cool to about 50 degrees C. and approximately 2 cc of the black solution was deposited onto a thin, flat sheet of glass. After the water fully evaporated, a thin, brown-colored PVA film was formed on the glass surface.

A transmission spectrum of the PVA/SLC film is shown in FIG. 6.

From the foregoing description, the principal advantages of using the yellow ocular pigment or its synthetic version made from the polymerization of 3-hydroxy-Kynurenine, as an absorbing pigment in a media for radiation protection are:
1. The transmission of light by SLP decreases progressively as the energy of the light increases, and therefore as the potential for photooxidation increases.
2. The human vision system is accustomed to the transmission spectrum of SLP, in the way it perceives color and treats wavelength-dependent light scatter.
3. Consumers are more likely to accept the concept of using a light filter containing SLP to protect their vision because it is used by the body, thereby increasing the vision health of consumers.

While the invention has been described herein with reference to certain specific materials, procedures and examples, it is understood that the invention should not be restricted to these items used here mainly for the purpose of illustrations. Numerous variations of such details can be employed by those skilled in the art within the scope of this invention which is defined by the appended claims.

I claim:

1. An apparatus for absorbing ultraviolet, visible and near-infrared radiation emitted from natural or artificial sources, comprising:
   a transparent solid substrate; and
   a pigment derived from the polymerization of 3-hydroxy-kynurenine.

2. An apparatus according to claim 1 wherein the transparent solid substrate is a plastic.

3. An apparatus according to claims 1, or 2, in which the transparent solid substrate is formed by the polymerization of a monomer in a thermoset process and the pigment.

4. An apparatus according to claims 1, or 2, in which the transparent solid substrate is formed by the compounding or extrusion of a thermoplastic with the pigment.

5. An apparatus according to claims 1, or 2, in which the transparent solid substrate is a coating containing the pigment.

6. An apparatus according to claim 5 wherein the pigment is chemically modified by derivatization in order to achieve dispersion and solubility of the pigment in the coating.

7. An apparatus according to claims 1, or 2 wherein the pigment is chemically modified by derivatization in order to achieve dispersion and solubility of the pigment in the transparent solid substrate.

8. An apparatus according to claims 1, or 2 wherein the apparatus is an ophthalmic device.

9. An apparatus according to claims 1, or 2 wherein the apparatus is a sunglass lens.

10. An apparatus according to claims 1, or 2 wherein the apparatus is a hard or hydrophobic contact lens.

11. An apparatus according to claims 1, or 2 wherein the apparatus is an intraocular device.

12. An apparatus according to claims 1, or 2 wherein the apparatus is a packaging device.

13. An apparatus according to claims 1, or 2 wherein the apparatus is a plastic film.

14. An apparatus according to claims 1, or 2 wherein the apparatus is a window.

15. An apparatus according to claims 1, or 2 wherein the apparatus is an umbrella.

16. An apparatus according to claims 1, or 2 wherein the apparatus is a canopy.

17. An apparatus according to claim 1 wherein the pigment is derived from the oxidative polymerization of 3-hydroxy-kynurenine.

18. An apparatus according to claim 1 wherein the pigment is a pigment present in a human crystalline lens.

19. An apparatus according to claim 1 wherein the pigment has a transmission spectrum identical to the transmission spectrum of a pigment present in a human crystalline lens.

20. An apparatus according to claim 1 wherein the pigment is a yellow pigment present in a human crystalline lens.

* * * * *